United States Patent Office 3,696,068
Patented Oct. 3, 1972

3,696,068
ORGANOSILOXANE ELASTOMERS
Charles Edward Creamer, Ridgefield, Conn., assignor to Union Carbide Corporation, New York, N.Y.
No Drawing. Filed May 18, 1970, Ser. No. 38,475
Int. Cl. C08g 47/06, 51/50; C08f 35/02
U.S. Cl. 260—29.1 B
30 Claims

ABSTRACT OF THE DISCLOSURE

Crosslinked silicone elastomers; vinyl containing linear organosiloxane copolymer fluids said vinyl radicals constituting from about 5 to about 10 weight percent of the copolymer fluids; and heat-curable silicone gumstock compositions comprising (1) a crosslinkable diorganopolysiloxane gum containing vinylsiloxy units and (2) vinyl containing linear organosiloxane copolymer fluids said vinyl radicals constituting from about 3 to about 17 weight percent of the copolymer fluids, for use in the production of said silicone elastomers.

BACKGROUND OF THE INVENTION

This invention relates to novel organosiloxane compounds, to novel heat-curable gumstock compositions for use in the production of silicone elastomers; and to the novel silicone elastomers derived from said gum compositions. More particularly this invention relates to novel vinyl containing organosiloxane copolymer fluids, to novel heat-curable gumstock compositions comprising a diorganopolysiloxane gum containing vinyl siloxy units and a vinyl containing organosiloxane copolymer fluid for use in the production of silicone elastomers and the novel crosslinked silicone elastomers derived therefrom.

Silicone elastomers and methods for preparing such elastomers from heat-curable gumstock compositions which utilize as the gum compound, a diorganopolysiloxane gum containing vinyl siloxy units are well known in the art as witnessed, for example by U.S. Pats. 2,445,799; 2,954,357 and 3,183,205. One of the problems of this particular type of silicone rubber has been the formulation of such rubbers having both low compression set values and high die "B" tear strength, for while it has been found that silicone elastomers derived from vinyl containing diorganopolysiloxane gums possess low compression set, they also in many instances exhibit the disadvantage of not having very high die "B" tear strength. This combination of properties, low compression set and high die "B" tear strength, in silicone rubber is extremely desirable for many of its numerous uses, such as in the fabrication of gaskets, seals, extrusions, and the like.

Several methods have been employed to improve the die "B" tear strength of such silicone rubbers, such as by limiting the crosslink density of the vulcanized product either through restriction of the amount of peroxide catalyst used for vulcanization and/or by reducing the number of crosslinkable groups in the vinyl containing siloxane gum upon which the heat-curable composition is formulated. While such procedures do result in improving the die "B" tear strength of the crosslinked elastomer, this improvement in one property is generally nullified for the most part by an accompanying increase in the compression set value for said elastomer.

SUMMARY OF THE INVENTION

It has now been discovered that silicone elastomers having high die "B" tear strength as well as low compression set values can be prepared according to the instant invention which involves curing a heat-curable gumstock composition comprising a diorganopolysiloxane gum containing vinyl siloxy units and a vinyl containing linear organosiloxane copolymer fluid, some fluids of which are novel compounds in their own right.

Therefore, it is an object of this invention to provide novel vinyl containing linear organosiloxane copolymer fluids. It is a further object of this invention to provide heat-curable gumstock compositions for use in the production of silicone elastomers, comprising a diorganopolysiloxane gum containing vinylsiloxy units and a vinyl containing linear organosiloxane copolymer fluid. It is still another object of this invention to provide silicone elastomers derived from the above said gum compositions. Other objects and advantages of this invention will become readily apparent from the following description and appended claims.

More specifically the heat-curable silicone gumstock compositions of this invention comprise (1) a crosslinkable diorganopolysiloxane gum containing vinylsiloxy units and (2) a linear vinyl containing dihydrocarbon siloxane copolymer fluid having a viscosity of from about 10 to about 150,000 centistokes at 25° C. and consisting essentially of at least one siloxy unit of the formula $R_2SiO$ wherein each R is individually a saturated monovalent hydrocarbon radical and at least one siloxy unit of the formula $R'(Vi)SiO$ wherein each R' is individually a monovalent hydrocarbon radical and Vi is a vinyl ($CH_2\!\!=\!\!CH\!-\!$) radical, said vinyl radicals constituting from about 3 to about 17 weight percent of the total weight of the copolymer, and wherein said copolymer is terminated with end-blocking siloxy units of the formula $R_3SiO_{0.5}$ wherein each R is the same as defined above. The specific novel linear vinyl containing dihydrocarbon copolymer fluids of this invention are those as defined above, wherein each R and R' radical in the above siloxy formulas are lower alkyl radicals and wherein the vinyl radicals constitute from about 5 to about 10 weight percent of the total weight of the copolymer.

DESCRIPTION OF THE PREFERRED EMBODIMENTS

The siloxane gumstock ingredient of the instant heat-curable compositions which are employed in producing the crosslinked silicone elastomers of this invention are those curable diorganopolysiloxane gums containing from about 0.01 to about 1.0 weight percent of vinylsiloxy units. Such compounds as well as methods for their preparation are well known in the art as shown for example by U.S. Pat. Nos. 2,445,799; 2,954,357 and 3,183,205, the disclosures of which patents are incorporated herein by reference thereto. Preferably the siloxane gums employed in this invention are those linear diorganopolysiloxane gums comprising (a) diorganosiloxy units selected from the class consisting of dimethylsiloxy, diethylsiloxy, diphenylsiloxy, methylethylsiloxy, methylphenylsiloxy, ethylphenylsiloxy, cyanopropyl methylsiloxy, trifluoropropyl methylsiloxy, and the like, and (b) vinylsiloxy units selected from the class consisting of methylvinylsiloxy, ethylvinylsiloxy, phenylvinylsiloxy, divinylsiloxy, and the like, wherein the ratio of pendent radical groups to silicon atoms of the gums ranges from about 1.95 to 2.05, preferably about 2. It is generally preferred to employ those gums wherein about 0.02 to about 0.8 weight percent of the siloxy units in said gums are vinyl siloxy units, especially methylvinylsiloxy units. Specific examples of some of the more preferred siloxane copolymer gumstocks are a copolymer of dimethylsiloxy and methylvinylsiloxy units, a copolymer of diethylsiloxy and methylvinylsiloxy units, a terpolymer of dimethylsiloxy, diphenylsiloxy and methylvinylsiloxy units, a terpolymer of diethylsiloxy, dimethylsiloxy and methylvinylsiloxy units. Of course, it is to be understood that a single type of the vinyl containing siloxane gum species can be employed or if desired various combinations of different vinyl containing siloxane gums can be used to formulate the gumstock that is to be cured into the elastomeric product.

The linear vinyl containing dihydrocarbon siloxane copolymer fluids that are present as the second essential ingredient of the heat curable gum compositions of this invention are those vinyl siloxanes having viscosities of from about 10 to about 150,000 centistokes at 25° C. and consisting essentially of siloxy units of the formula $R_2SiO$ wherein each R is individually a saturated monovalent hydrocarbon radical, such as lower alkyl, e.g. methyl, ethyl, etc., and aryl radicals, e.g. phenyl, etc.; and siloxy units of the formula $R'(Vi)SiO$ wherein each R' is individually a monovalent hydrocarbon radical, such as lower alkyl, e.g. methyl, ethyl, etc.; aryl, e.g. phenyl, etc. and Vi is a vinyl ($CH_2$=CH—) radical, said vinyl radicals constituting from about 3 to about 17 weight percent of the total weight of the copolymer, and wherein the copolymers are terminated with endblocking siloxy units of the formula $R_3SiO_{0.5}$ wherein each R is the same as defined above. These trihydrocarbon terminated linear vinyl siloxane copolymers have a weight average molecular weight of from about 1000 grams/mole to about 100,000 grams/mole and are not the same as and are not to be confused with the crosslinkable vinyl siloxane gum ingredients of this invention for said vinyl containing organopolysiloxane gumstocks normally have viscosities well in excess of 200,000 centistokes at 25° C. Of course, it is to be understood that a single species of such vinyl siloxane copolymer fluids can be employed or, if desired, mixtures of different types of said copolymer fluids can be used.

Illustrative examples of such copolymer fluids are those consisting essentially of siloxy units selected from the group consisting of dimethylsiloxy, diethylsiloxy, diphenylsiloxy, methylethylsiloxy, methylphenylsiloxy, ethylphenylsiloxy and the like, and siloxy units selected from the group consisting of methylvinylsiloxy, ethylvinylsiloxy, phenylvinylsiloxy, and the like and wherein the linear copolymer is terminated with such siloxy units as trimethylsiloxy, triethylsiloxy and the like. Preferably the linear vinyl siloxane copolymer fluids are those wherein the vinyl radicals constitute from about 5 to about 10 weight percent of the total weight of the copolymer. Among the more preferred copolymer fluids are those wherein the vinylsiloxy unit is a methylvinylsiloxy unit, especially those linear vinyl siloxane copolymer fluids consisting essentially of terminal trimethylsiloxy units, dimethylsiloxy units and methylvinylsiloxy units.

The above linear vinyl containing dihydrocarbon siloxane copolymer fluids can be easily prepared by conventional base catalyzed coequilibration of cyclic dihydrocarbon siloxanes and cyclic vinyl hydrocarbon siloxanes in the presence of linear trihydrocarbon endblocked dihydrocarbon siloxanes as shown for example by U.S. Pats. 3,183,205 and 2,714,099.

Furthermore, it is considered that the linear vinyl containing dialkyl siloxane copolymer fluids of this invention, wherein the vinyl radicals constitute from about 5 to about 10 weight percent of the total weight of the copolymer and wherein the terminal endblocking siloxane units are trialkylsiloxy units and the vinylsiloxane units are alkylvinyl siloxy units, are novel compounds, per se. Such copolymer fluids would therefore be composed essentially of $R_2SiO$, $R'(Vi)SiO$ and $R_3SiO_{0.5}$ siloxy units wherein each R and R' group is a lower alkyl radical such as methyl and ethyl, especially methyl, and where Vi represents a vinyl ($CH_2$=CH—) radical.

The method for preparing the crosslinked silicone elastomers of this invention is not critical and is based on the heretofore conventional procedures employed in curing, i.e. crosslinking, a heat-curable gumstock composition. Said procedure is well known in the art and defined in any number of silicone rubber patents as shown for example by U.S. Pats. 2,445,799; 2,954,357 and 3,183,205. Briefly the preferred procedure involves adding a catalytic amount of any suitable conventional catalyst heretofore employed in producing such silicone rubber to a mixture of the gum and fluid and heating the mixture at temperatures from about 230° F. to about 350° F. or above until the gum has been cured, i.e. crosslinked into a silicone elastomer. Of course the siloxane gum, siloxane fluid and catalysts can be mixed in any manner or order. The amount of linear vinyl containing dihydrocarbon siloxane copolymer fluid employed can range from about 0.5 to about 5 parts by weight per 100 parts by weight of the crosslinkable vinyl containing diorganopolysiloxane gum used, while amounts of from about 0.5 to about 2.0 parts by weight per 100 parts by weight of gum will generally be sufficient for most purposes. It is also to be understood that the particular curing procedure is not critical and that any known method can be employed, such as light radiation curing of the gumstock composition, etc. Conventional precuring and/or post curing treatments can also be employed if desired.

As stated any conventional catalyst can be employed. Illustrative examples of such catalysts include the organic peroxide curing agents such as, di-t-butyl peroxide; t-butyl, triethylmethylperoxide; t-butyl-t-triptyl peroxide, dicumyl peroxide, benzoyl peroxide, t-butylperbenzoate, 1,4-dichlorobenzoyl peroxide; 2,4-dichlorobenzoyl peroxide, monochlorobenzoyl peroxide, and the like. Moreover, any single catalyst or mixtures of two or more different catalysts can be employed. Such curing agents are well known and described in the prior art.

Moreover, it is generally preferred and desirable to add a filler to the heat curable gumstock composition to give substance and body to the crosslinked elastomer product. The nature of the filler is also not critical and any conventional filler heretofore employed in producing silicone rubbers can be used. Such fillers are also well known in the art. Illustrative examples of such conventional fillers are carbon black, silica base fillers such as, pyrogenic silica, precipitated filler, fume silica, silica gel, and the like, inorganic fillers such as diatomaceous earths, clay, calcium carbonate, titania, iron oxide, zinc oxide, aluminum oxide, and the like. Of course, the fillers can be employed individually or in combination with one another. Generally, it is preferred to employ finely divided silica base fillers of the highly reinforcing type either alone or in combination with inorganic fillers. The amount of filler, when used, that is present in the siloxane gumstock composition merely depends on the ultimate elastomer product desired. Generally amounts of filler from about 10 to about 200 parts by weight based on the weight of the siloxane gum employed will be sufficient for most purposes.

It should also be understood that the instant heat-curable siloxane gumstock compositions, if desired, can contain other conventional silicone rubber additives which do not effect the instant invention or its basic purpose, such as pigments, dyestuffs, antioxidants, thermal stabilizers, oxide accelerators or retardants, and the like.

For example, in many instances it is desirable and preferable to add a small amount of a linear dihydrocarbon polysiloxane oil selected from the group consisting of hydroxy and/or alkoxy end-blocked (terminated) polysiloxanes or amino end-blocked polysiloxanes, or mixtures of such oils. Such siloxane oils containing hydroxy and/or alkoxy or amino groups bonded to each the terminal silicon atoms of the siloxane are well known in the art and can often be used to help plasticize the gumstock composition and/or prevent bin-age stiffening of the vinyl containing siloxane gum prior to curing same, such oils are disclosed for example by U.S. Pat. 2,954,357, Belgium Pat. 534,217 and U.S. Pat. 3,467,686.

Such siloxane oils generally have a weight average molecular weight of from about 400 to about 2700

(gram/mole) preferably about 600 to about 1500 and contain terminal alkoxy and/or hydroxy or amino groups in an amount by weight of from about 2 to 25 percent preferably about 8 to 20 percent. Among the more preferred siloxane oils are linear dimethylsiloxanes endblocked with ethoxy and/or hydroxy or dimethylamino groups having from 4 to 35 or more (preferably about 8 to 20) dimethylsiloxy units per molecule and having an average of from 1 to 1.5 ethoxy and/or hydroxy or dimethylamino groups bonded to each of the terminal silicon atoms thereof. When employed, amounts of such siloxane oils are not narrowly critical and usually range from about 4 to about 50 parts by weight per 100 parts by weight of the vinyl siloxane gum employed, although lower or higher amounts can be employed if desired.

It has been surprisingly discovered that the above described linear vinyl containing siloxane copolymer fluids when added to a vinylsiloxane gumstock composition greatly increased the die "B" tear strength of the cross-linked siloxane elastomer products derived from said compositions, and at the same time, were also found not to adversely affect the low compression set values of said elastomers.

An additional unique feature of this invention is the excellent tear strength of the instant crosslinked silicone elastomers as witnessed by the noticeable improvement in the notch sensitivity of said elastomers derived from the instant gumstock compositions. It has been surprisingly found that the die "B" tear strength of the instant silicone elastomers of this invention was not affected by the notch depth, that is to say, that the instant silicone elastomers exhibited a relatively constant die "B" tear strength regardless of the depth of the test notch or cut employed in evaluating said tear strength. Comparative silicone elastomers prepared from vinyl siloxane gumstock compositions minus the instant vinyl containing dihydrocarbon copolymer fluids of this invention on the other hand, exhibited a very noticeable reduction in their die-B-tear strengths as the depth of the test notch or cut employed in the evaluation of said tear strength was increased.

The crosslinked silicone elastomers of this invention have a wide range of utility that is well known in the art as shown for example by the above mentioned patents. For instance, the elastomers of this invention due to their combined low compression set and high die "B" tear strength along with their strong resistance to tearing regardless of notch depth are particularly suited for use in the manufacture of air frame seals, gaskets, extrusions, e.g. wire coatings, and the like.

The following examples are illustrative of the present invention and are not to be regarded as limitative. It is to be understood that all of the parts, percentages and proportions referred to herein, in said examples and in the appended claims are by weight unless otherwise indicated. Moreover, the following terms and expressions where employed are to be interpreted as indicated below.

GLOSSARY

(A) Compression set

Degree of failure of a sample to return to its original size after removal of a deforming force. The compression set values were measured according to A.S.T.M. D-395-67-B. The specimen was compressed for 22 hours at 300° F. and the permanent change in height of the specimen measured and the percent set calculated.

(B) Die "B" tear strength

Force required to tear a specimen divided by thickness represents the tear strength (lb./in.). The die "B" tear strength values were measured according to A.S.T.M. D-624-54 employing a 20 mil notch unless otherwise reported.

(C) Elongation

Amount of stretch of a sample under a tensile force expressed as a percentage of the original length.

$$\frac{(\text{Stretched length-original length})}{\text{Original length}} \times 100$$

(D) Hardness

Degree of indentation produced by a plunger or indentor under a specified load. Measured with a Shore A Durometer. The values range from 0 to a maximum hardness of 100.

(E) Tensile strength

The force necessary to rupture a rubber specimen when stretched to the breaking point divided by the original cross sectional area (lb./sq. in.).

(F) Symbols

Me represents a methyl ($—CH_3$) radical, Vi represents a vinyl ($—CH=CH_2$) radical.

(G) A.S.T.M. Slab, D 15–68a

The slab size is 6" by 6" by 0.08".

EXAMPLE A

A curable silicone rubber base compound was prepared by compounding about 4000 grams of a polydimethylsiloxane gumstock having a weight average molecular weight of about 750,000 grams/mole and containing about 0.1 weight percent of methylvinylsiloxy units on a 10 inch by 24 inch laboratory roll mill with about 2000 grams of silica filler having a surface area of 300 sq. meters/grams; and with 624 grams of a linear hydroxy terminated dimethylsiloxane oil having a weight average molecular weight of about 1620 (gr./mole) and containing about 2.1 percent by weight of hydroxy groups. The compound was then aged for twenty-four hours and reworked to produce a soft plyable compound which was then hot milled for ten minutes at 300° F., cooled to room temperature and the curable silicone rubber base compound was cut and stored in sheet form for an additional forty-eight hours.

EXAMPLE 1

A cross-linked silicone elastomer was prepared by replasticizing 240 grams of the silicone rubber base compound of Example A on a 6 inch by 10 inch roll mill with 1.80 grams of 2,4-dichlorobenzoyl peroxide catalyst and mold curing the catalyzed composition into standard A.S.T.M. silicone elastomer slabs at 250° F. for 10 minutes. The cross-linked silicone elastomer slabs were then post cured at 350° F. for four hours and cooled overnight. The properties of the resulting elastomer appear in Table 1, below.

EXAMPLE 2

A cross-linked silicone elastomer was prepared by replasticizing 240 grams of the silicone rubber base compound of Example A, on a 6 inch by 10 inch roll mill along with 2.4 grams of a linear vinyl containing dihydrocarbon siloxane copolymer fluid of the formula

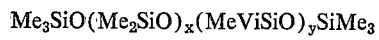

having a viscosity of about 10,000 centistokes at 25° C. and wherein the vinyl radicals constituted about 6.4 weight percent of the copolymer, and 1.80 grams of 2,4-dichlorobenzoyl peroxide catalysts and mold curing the catalyzed composition into standard A.S.T.M. silicone elastomer slabs at 250° F. for 10 minutes. The cross-linked silicone elastomer slabs were then post cured at 350° F. for four hours and cooled overnight. The properties of the resulting elastomer appear in Table 1, below.

EXAMPLE 3

The procedure of Example 2 was repeated except that 4.8 grams of a linear vinyl containing dihydrocarbon siloxane copolymer fluid of the formula $$Me_3SiO(Me_2SiO)_x(MeViSiO)_ySiMe_3$$

having a viscosity of about 1,360 centistokes at 25° C. and wherein the vinyl radicals constituted about 6.4 weight percent of the copolymer was employed. The properties of the resulting elastomer appear in Table 1, below.

EXAMPLE 4

The procedure of Example 2 was repeated except that the linear siloxane copolymer fluid had a viscosity of about 1,400 centistokes at 25° C. and the vinyl radicals constituted about 9.6 weight percent of the copolymer. The properties of the resulting elastomer appear in Table 1, below.

EXAMPLE 5

The procedure of Example 3 was repeated except that the linear siloxane copolymer fluid had a viscosity of about 10,500 centistokes at 25° C. and the vinyl radicals constituted about 9.6 weight percent of the copolymer. The properties of the resulting elastomer appear in Table 1, below.

EXAMPLE 6

The procedure of Example 2 was repeated except that the linear siloxane copolymer fluid had a viscosity of about 145,000 centistokes at 25° C. and the vinyl radicals constituted about 6.4 weight percent of the copolymer. The properties of the resulting elastomer appear in Table 1, below.

EXAMPLE 7

The procedure of Example 3 was repeated except that the linear siloxane copolymer fluid had a viscosity of about 200 centistokes at 25° C. and the vinyl radicals constituted about 6.4 weight percent of the copolymer. The properties of the resulting elastomer appear in Table 1, below.

EXAMPLE 8

The procedure of Example 2 was repeated except that the linear siloxane copolymer fluid had a viscosity of about 200 centistokes at 25° C. and the vinyl radicals constituted about 9.6 weight percent of the copolymer. The properties of the resulting elastomer appear in Table 1, below.

EXAMPLE 9

The procedure of Example 3 was repeated except that the linear siloxane copolymer fluid had a viscosity of about 137,000 centistokes at 25° C. and the vinyl radicals constituted about 9.6 weight percent of the copolymer. The properties of the resulting elastomer appear in Table 1, below.

EXAMPLE 10

The procedure of Example 2 was repeated except that the linear siloxane copolymer fluid had a viscosity of about 1,350 centistokes at 25° C. and the vinyl radicals constituted about 3.2 weight percent of the copolymer. The properties of the resulting elastomer appear in Table 1, below.

EXAMPLE 11

The procedure of Example 3 was repeated except that the linear siloxane copolymer fluid had a viscosity of about 10,000 centistokes at 25° C. and the vinyl radicals constituted about 3.2 weight percent of the copolymer. The properties of the resulting elastomer appear in Table 1, below.

EXAMPLE 12

The procedure of Example 2 was repeated except that the linear siloxane copolymer fluid had a viscosity of about 10,500 centistokes at 25° C. and the vinyl radicals constituted about 12.8 weight percent of the copolymer. The properties of the resulting elastomer appear in Table 1, below.

EXAMPLE 13

The procedure of Example 3 was repeated except that the linear siloxane copolymer fluid had a viscosity of about 1,500 centistokes at 25° C. and the vinyl radicals constituted about 12.8 weight percent of the copolymer. The properties of the resulting elastomer appear in Table 1, below.

EXAMPLE 14

The procedure of Example 2 was repeated except that the linear siloxane copolymer fluid had a viscosity of about 200 centistokes at 25° C. and the vinyl radicals constituted about 3.2 weight percent of the copolymer. The properties of the resulting elastomer appear in Table 1, below.

EXAMPLE 15

The procedure of Example 3 was repeated except that the linear siloxane copolymer fluid had a viscosity of about 140,000 centistokes at 25° C. and the vinyl radicals constituted about 12.8 weight percent of the copolymer. The properties of the resulting elastomer appear in Table 1, below.

EXAMPLE 16

The procedure of Example 2 was repeated except that the linear siloxane copolymer fluid had a viscosity of about 10,000 centistokes at 25° C. and the vinyl radicals constituted about 3.2 weight percent of the copolymer. The properties of the resulting elastomer appear in Table 1, below.

EXAMPLE 17

The procedure of Example 3 was repeated except that the linear siloxane copolymer fluid had a viscosity of about 10,000 centistokes at 25° C. and the vinyl radicals constituted about 12.8 weight percent of the copolymer. The properties of the resulting elastomer appear in Table 1, below.

EXAMPLE 18

The procedure of Example 3 was repeated except that 4.8 grams of a cyclic siloxane fluid mixture of about 80 wt. percent of $[MeViSiO]_4$ and about 20 wt. percent of $[MeViSiO]_5$ said fluid mixture having a viscosity of about 2.5 centistokes at 25° C., the vinyl radicals constituting about 31.4 weight percent of the polymer were employed instead of the linear vinyl containing siloxane fluid. The properties of the resulting elastomer appear in Table 1, below.

TABLE 1

| Example | Hardness (Shore A) | Tensile (p.s.i.) | Elongation (percent) | Compression set (percent) | Die "B" tear (lb./in.) |
|---|---|---|---|---|---|
| 1 | 57 | 1,400 | 310 | 30 | 47 |
| 2 | 58 | 1,320 | 280 | 25 | 70 |
| 3 | 57 | 1,400 | 300 | 28 | 95 |
| 4 | 59 | 1,160 | 260 | 26 | 80 |
| 5 | 58 | 1,450 | 330 | 28 | 85 |
| 6 | 57 | 1,400 | 300 | 29 | 70 |
| 7 | 57 | 1,400 | 300 | 28 | 70 |
| 8 | 56 | 1,360 | 310 | 27 | 70 |
| 9 | 57 | 1,320 | 300 | 30 | 90 |
| 10 | 57 | 1,240 | 290 | 25 | 65 |
| 11 | 58 | 1,400 | 290 | 25 | 70 |
| 12 | 58 | 1,300 | 300 | 27 | 80 |
| 13 | 56 | 1,400 | 340 | 29 | 75 |
| 14 | 57 | 1,200 | 275 | 27 | 60 |
| 15 | 57 | 1,400 | 350 | 30 | 90 |
| 16 | 56 | 1,160 | 300 | 29 | 70 |
| 17 | 56 | 1,400 | 360 | 31 | 95 |
| 18 | 62 | 1,260 | 240 | 22 | 45 |

The above results clearly demonstrate that the die "B" tear strength of cross-linked silicone elastomers derived from vinyl containing siloxane gumstocks can be greatly improved by adding a linear vinyl containing dihydrocarbon siloxane copolymer fluid to the gumstock without any substantially adverse affect upon the other properties such as hardness, tensile strength and compression set of the elastomers. This discovery is indeed surprising since no such improvement was found when cyclic vinyl containing polymer fluids were employed.

EXAMPLE 19

A curable silicone rubber base compound was prepared by compounding about 400 grams of a terpolymeric organopolysiloxane gumstock (wt. avg. mol. wt. of about 650,000 gr./mole) containing about 15 percent by weight of diphenylsiloxy units, about 0.1 percent by weight of methylvinylsiloxy units, and about 84.9 percent by weight of dimethylsiloxy units on a roll mill with about 200 grams of silica and 62.4 grams of a linear hydroxy terminated dimethylsiloxane oil having a wt. avg. molecular weight of about 1600 (gr./mole) and containing about 2.1 percent by weight of hydroxy groups. The compound was then hot milled for 10 minutes at 300° F., then cooled to room temperature and the curable silicone rubber base compound recovered from the mill.

240 grams of silicone rubber base compound were catalyzed with 1.3 grams of 2,4-dichlorobenzoyl peroxide and mold cured (i.e. cross-linked into an elastomer) into standard A.S.T.M. silicone elastomer slabs at 250° F. for ten minutes. This silicone elastomer product was labeled Sample A.

An additional 240 grams of the above prepared silicone rubber base compound were first milled with about 1.5 grams of a linear vinyl containing dihydrocarbon siloxane copolymer fluid formula

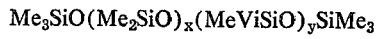
$$Me_3SiO(Me_2SiO)_x(MeViSiO)_ySiMe_3$$

having a viscosity of about 20,000 centistokes at 25° C. and wherein the vinyl (Vi) radicals constituted about 6.4 weight percent of the copolymer and then cured into a cross-linked silicone elastomer by the same procedure and conditions given above for Sample A. This silicone elastomer product was labeled Sample B.

A comparison of the properties of both elastomers is given in the following table.

TABLE 2

| Elastomer | Hardness (Shore A) | Tensile (p.s.i.) | Elongation (percent) | Compression set (percent) | Die "B" tear (lb./in.) |
|---|---|---|---|---|---|
| Sample: | | | | | |
| A | 58 | 1,120 | 500 | 77 | 160 |
| B | 66 | 1,100 | 530 | 74 | 190 |

Following the procedure described above for this invention other cross-linked silicone elastomers can be prepared with like results by employing different silicone gums, such as a copolymer gumstock of diethylsiloxy and methylvinyl siloxy units, a terpolymer gumstock of diethylsiloxy, dimethylsiloxy and methylvinyl siloxy units and the like, and/or by employing different linear dihydrocarbon polysiloxane oils such as ethoxy, hydroxy endblocked dimethyl siloxane oil, ethoxy endblocked dimethyl siloxane oil, dimethylamino endblocked dimethyl siloxane oil, and the like; and/or by employing different catalysts such as benzoyl peroxide, ditertiary butyl peroxide, 2,5-dimethyl-2,5-bis(t-butylperoxy)hexane, and the like.

EXAMPLE 20

To illustrate the effect of notch depth on the silicone elastomer products of Example 19 the test specimens were notched at 20, 30 and 40 mils for both samples and die "B" tear strength of each notch measured. The average values of three specimens at each notch depth is given in the following table.

TABLE 3
[Die "B" tear strength (lb./in.)]

| Elastomer | Notch depth | | |
|---|---|---|---|
| | 20 mils | 30 mils | 40 mils |
| Sample: | | | |
| A | 145 | 103 | 103 |
| B | 190 | 193 | 187 |

The above results clearly demonstrate the marked improvement in notch sensitivity of the cross-linked elastomers of the instant invention. Note that the tear strength of Sample B was not adversely affected by the notch depth while the tear strength of Sample A greatly deteriorated when the notch depth was increased from 20 to 30 mils.

EXAMPLE 21

A cross-linked silicone elastomer having very good die "B" tear strength and low compression set can be obtained by compounding 100 grams of dimethylpolysiloxane gumstock containing 0.02 weight percent of methylvinylsiloxy units and having a weight average molecular weight of about 750,000 grams/mole with 50 grams of silica filler and 15.6 grams of a hydroxy endblocked dimethylsiloxane oil having 2.1 weight percent of terminal hydroxy groups and a wt. avg. mol. wt. of about 1600 gr./mole on a mill at 350° F. for 10 minutes to give a curable silicone rubber base compound. After cooling the base compound is milled with two grams of a linear vinyl containing dihydrocarbon siloxane copolymer fluid containing trimethylsiloxy units, dimethylsiloxy units and methylvinylsiloxy units and having a viscosity of about 20,000 centistokes at 25° C., said vinyl radicals constituting about 6.4 weight percent of the copolymer fluid and then catalyzed with 1.08 grams of benzoylperoxide and mold cured at 240° F. for 10 minutes to yield the cross-linked silicone elastomer which can be post cured, e.g. for four hours at 350° F., if desired.

EXAMPLE 22

Analogously a cross-linked silicone elastomer having very good die "B" tear strength and low compression set can be obtained by compounding 500 grams of a dimethylpolysiloxane gumstock having a weight average molecular weight of 625,000 grams/mole and containing 0.4 weight percent of methylvinylsiloxy units with 200 grams of precipitated silica filler and 60 grams of an ethoxy endblocked dimethylsiloxane oil having the formula $(C_2H_5O)(SiMe_2O)_7(OC_2H_5)$ to furnish a curable silicone rubber base compound. If desired the base compound can be aged (e.g. stored for three days) then reworked on the mill at 300° F. for 10 minutes and bin-aged for one week. The base compound can then be milled with 2.5 grams of a linear vinyl dihydrocarbon siloxane copolymer fluid containing trimethylsiloxy units, dimethylsiloxy units and methylvinylsiloxy units and having a viscosity of about 10,000 centistokes at 25° C., said vinyl radicals constituting about 17.0 weight percent of the copolymer fluid and then catalysed with 0.5 part of 2,4-dichlorobenzoyl peroxide per 100 parts of the base compound and mold cured at 250° F. for 10 minutes to yield the cross-linked silicone elastomer which can be post cured, e.g. for four hours at 350° F. if desired.

EXAMPLE 23

A linear vinyl containing dimethylsiloxane copolymer fluid consisting essentially of trimethylsiloxy end-blocking units ($Me_3SiO_{0.5}$), dimethyl siloxy units ($Me_2SiO$) and methyl vinyl siloxy units $(Me)(Vi)SiO$ having a viscosity of about 20,000 centistokes at 25° C. and wherein the vinyl radicals constituted about 6.4 weight percent of the copolymer was prepared by charging about 80 grams of dimethylcyclicsiloxane. $[Me_1SiO]_4$; about 20 grams of methylvinylcyclic siloxane, $[Me(Vi)SiO]_4$; and about 0.31 gram of linear siloxane polymer of the formula $Me_3SiOSiMe_3$ to a 200 cc. flask. The contents were heated for one hour at 90° C., followed by addition of about 10 parts per million of tetramethyl ammonium catalyst from tetramethyl ammonium silanolate and the reactants equilibrated for about six hours. The reaction product was heated to 150° C. for three hours with a mild dry nitrogen sparged. About 85 to 90 grams of the above defined linear vinyl containing dimethyl siloxane copolymer was recovered in the form of a clear liquid.

The viscosity and vinyl radical weight percent content of the above linear vinyl containing dimethyl siloxane copolymer can be easily controlled merely by following the above procedure and varying the amount of reactants employed.

For instance, the vinyl radical weight percent content of the linear vinyl containing siloxane product of Example 23 can be varied and controlled by following the above procedure of said example, but employing (a) about 70 grams of $[Me_2SiO]_4$ and about 30 grams of $[Me(Vi)SiO]_4$ to achieve about a 9.6 weight percent vinyl radical content for the copolymer; (b) about 84.4 grams of $[Me_2SiO]_4$ and about 15.6 grams $[Me(Vi)SiO]_4$ to achieve about a 5 weight percent vinyl radical content for the copolymer; (c) about 68.7 grams of $[Me_2SiO]_4$ and about 31.3 grams of $[Me(Vi)SiO]_4$ to achieve about a 10 weight percent vinyl radical content for the copolymer, and the like.

In similar fashion the viscosity of the linear vinyl containing siloxane product of Example 23 can be varied and controlled by following the above procedure of said example but employing (a) about 0.45 gram of $Me_3SiOSiMe_3$ to achieve about a 10,000 viscosity (centistokes at 25° C.) for the copolymer; (b) about 1.5 grams of $Me_3SiOSiMe_3$ to achieve about a 200 viscosity (centistokes at 25° C.) for the copolymer; and the like.

Various modifications and variations of this invention will be obvious to a worker skilled in the art and it is to be understood that such modifications and variations are to be included within the purview of this application and the spirit and scope of the appended claims.

What is claimed is:

1. A heat curable silicone gumstock composition comprising (1) 100 parts by weight of a crosslinkable diorganopolysiloxane gum containing from about 0.01 to about 1.0 weight percent of vinyl siloxy units wherein the diorganopolysiloxane gum consists essentially of diorganosiloxy units selected from the class consisting of dimethylsiloxy, diethylsiloxy, diphenylsiloxy, methylethylsiloxy, methylphenylsiloxy and ethylphenylsiloxy units and vinyl siloxy units selected from the class consisting of methylvinylsiloxy, ethylvinylsiloxy, phenylvinylsiloxy, and divinylsiloxy units, and (2) from about 0.5 to about 5 parts by weight of a linear vinyl containing dihydrocarbon siloxane copolymer fluid having a viscosity of from about 10 to about 150,000 centistokes at 25° C. and consisting essentially of at least one siloxy unit of the formula $R_2SiO$ wherein each R is individually a saturated monovalent hydrocarbon radical and at least one siloxy unit of the formula R'(Vi)SiO wherein each R' is individually a monovalent hydrocarbon radical selected from the class consisting of lower alkyl and phenyl radicals, and Vi is a vinyl radical said vinyl radicals constituting from about 3 to about 17 weight percent of the total weight of the copolymer and wherein said copolymer is terminated with end-blocking siloxy units of the formula $R_3SiO_{0.5}$ wherein each R is the same as defined above.

2. A heat curable gumstock composition as defined in claim 1, wherein the vinylsiloxy units are methylvinylsiloxy units.

3. A heat curable gumstock composition as defined in claim 2, wherein the hydrocarbon radicals of the linear vinyl containing siloxane fluid are methyl radicals.

4. A heat curable gumstock composition as defined in claim 1, wherein the linear vinyl containing hydrocarbon siloxane copolymer fluid has a viscosity of about 5,000, to 25,000 centistokes at 25° C.

5. A heat curable gumstock composition as defined in claim 4 wherein the hydrocarbon radicals of the linear vinyl containing siloxane copolymer fluid are methyl and wherein the vinyl radicals constitute from about 5 to about 10 weight percent of said copolymer.

6. A heat curable gumstock composition as defined in claim 5, wherein the vinyl radicals constitute about 6.4 weight percent of said linear copolymer fluid.

7. A heat curable gumstock composition as defined in claim 1, which contains a filler as an additional ingredient.

8. A heat curable gumstock composition as defined in claim 7, which contains a linear dihydrocarbon polysiloxane oil or mixtures thereof selected from the group consisting of hydroxy, alkoxy and amino terminated polysiloxanes as an additional ingredient.

9. A heat curable gumstock composition as defined in claim 8, wherein the polysiloxane oil is an ethoxy terminated dimethyl polysiloxane oil.

10. A heat curable gumstock composition as defined in claim 3, wherein the vinyl radicals constitute from about 5 to 10 weight percent of said linear copolymer fluid.

11. A heat curable gumstock composition as defined in claim 10 wherein the amount of linear vinyl containing dihydrocarbon siloxane copolymer fluid ranges from about 0.5 to about 2 parts by weight per 100 parts by weight of the diorganopolysiloxane gum.

12. A heat curable composition as defined in claim 10, which contains a filler as an additional ingredient.

13. A heat curable gumstock composition as defined in claim 12, which contains a linear dihydrocarbon polysiloxane oil or mixtures thereof selected from the class consisting of hydroxy terminated dimethyl polysiloxane oil, alkoxy terminated dimethyl polysiloxane oil, and dimethylamino terminated dimethyl polysiloxane oil.

14. A heat curable gumstock composition as defined in claim 10, wherein the vinyl radicals constitute about 6.4 weight percent of said linear copolymer fluid.

15. A heat curable gumstock composition as defined in claim 13, wherein the linear dihydrocarbon polysiloxane oil is an ethoxy terminated dimethyl polysiloxane oil.

16. The cross-linked siloxane elastomer product derived from curing a gumstock composition as defined in claim 1.

17. The cross-linked siloxane elastomer product derived from curing a gumstock composition as defined in claim 11.

18. The cross-linked siloxane elastomer product derived from curing a gumstock composition as defined in claim 2.

19. The cross-linked siloxane elastomer product derived from curing a gumstock composition as defined in claim 4.

20. The cross-linked siloxane elastomer product derived from curing a gumstock composition as defined in claim 5.

21. The cross-linked siloxane elastomer product derived from curing a gumstock composition as defined in claim 6.

22. The cross-linked siloxane elastomer product derived from curing a gumstock composition as defined in claim 7.

23. The cross-linked siloxane elastomer product derived from curing a gumstock composition as defined in claim 8.

24. The cross-linked siloxane elastomer product derived from curing a gumstock composition as defined in claim 9.

25. The cross-linked siloxane elastomer product derived from curing a gumstock composition as defined in claim 3.

26. The cross-linked siloxane elastomer product derived from curing a gumstock composition as defined in claim 10.

27. The cross-linked siloxane elastomer product derived from curing a gumstock composition as defined in claim 12.

28. The cross-linked siloxane elastomer product derived from curing a gumstock composition as defined in claim 13.

29. The cross-linked siloxane elastomer product derived from curing a gumstock composition as defined in claim 14.

30. The cross-linked siloxane elastomer product derived from curing a gumstock composition as defined in claim 15.

References Cited
UNITED STATES PATENTS

| | | | |
|---|---|---|---|
| 2,819,236 | 1/1958 | Dickmann | 260—825 |
| 2,899,403 | 8/1959 | Lewis | 260—825 |
| 2,941,905 | 6/1960 | Hofmann | 260—825 |
| 2,954,357 | 9/1960 | Fekete | 260—29.1 B |
| 3,183,205 | 5/1965 | Bailey et al. | 260—825 |

SAMUEL H. BLECH, Primary Examiner

U.S. Cl. X.R.

204—159.13; 260—37 SB, 46.5 U, 46.5 G, 448.2 Q, 825